March 8, 1927.                          1,619,916
W. BREWSTER
RETAINER FOR AUTOMOBILE CUSHIONS
Filed Feb. 4, 1926
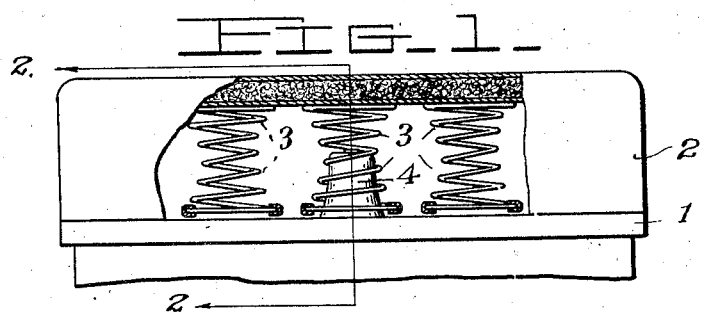
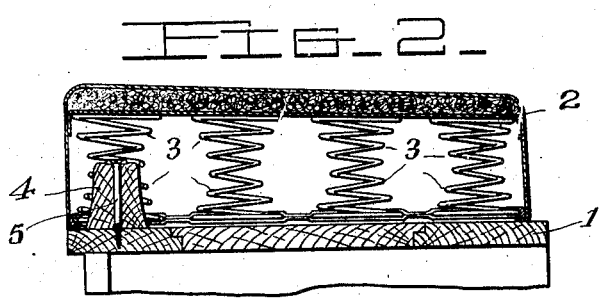
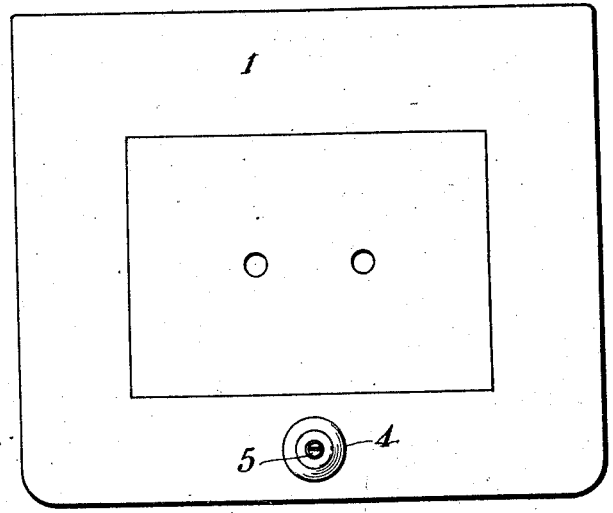
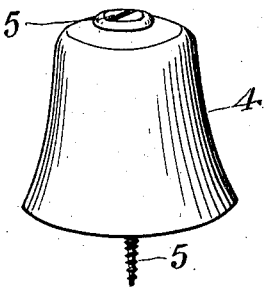
Inventor
William Brewster
by
Attorney Patented Mar. 8, 1927.

1,619,916

UNITED STATES PATENT OFFICE.

WILLIAM BREWSTER, OF NEW YORK, N. Y.

RETAINER FOR AUTOMOBILE CUSHIONS.

Application filed February 4, 1926. Serial No. 85,903.

This invention relates to cushion retainers for keeping in place the usual cushions used on automobile seat frames.

The object of the invention is to do away with the heavy metal lace plate that is secured to the seat frame adjacent its outer edges and that has along its front edge an upwardly extending lip behind which the front edge of the cushion is usually housed for the purpose of preventing any forward slipping of the cushion.

The cushion frame is provided with depending inverse volute springs which ordinarily seat against the surface of the seat frame and the invention consists in providing a stop block, preferably made of wood, which is screwed to the forward edge of the face of the seat frame and which is frusto-conical in shape so as to fit snugly within one of the volute springs when the cushion is placed in position on the seat frame whereby the cushion element is secured in position as against any forward slipping.

In the accompanying drawing which forms a part of this application—

Figure 1 is a front elevation illustrating a cushion in position on a seat frame, the front wall of the cushion being broken away so as to show the retainer block in position.

Figure 2 is a section at the line 2—2 of Figure 1.

Figure 3 is a detail plan view of a seat frame with the retainer block screwed thereto, and Figure 4 is a detail perspective view of the retainer block.

Similar numerals of reference denote like parts in the several figures of the drawing.

1 is the floor of an ordinary seat frame, 2 is an ordinary cushion having the usual inverse volute springs 3 depending interior thereof and 4 is the retainer block secured to the front edge of the floor 1 by means of a screw 5 passed through said block and driven into said floor.

This block is shown as extending upwardly within the coils of the middle forward volute spring and it will therefore be clear that the cushion will thereby be secured in position on the seat frame so that it cannot accidentally slip forward and also it will be evident that, owing to the frusto-conical shape of the block 4, the latter will conform closely to the coils of the spring, so that there can be no undue movement of the cushion frame.

While only one of these blocks is shown it will be evident that two of them can be employed one at each end of the seat frame and extending within the coils of the end volute springs.

This invention makes for considerable economy since it does away with the heavy steel frame before mentioned, and since the latter in the best make of cars is usually covered with leather, the latter is quite apt to be worn to the extent that it must be renewed.

What is claimed is:—

A cushion retainer for automobile seats, including a block, and means to attach the block to the front portion of the base of the seat frame, the block being of tapering formation so as to removably and conformably engage the adjacent volute spring of the cushion frame and being of substantial length so as to engage a substantial length of said spring thereby to prevent forward shifting of the cushion frame, by having binding engagement with the spring throughout the length of the block.

In testimony whereof I affix my signature hereto.

WILLIAM BREWSTER.